Jan. 9, 1923.
A. J. BARBER.
ABACUS FRAME.
FILED JULY 23, 1921.
1,441,323
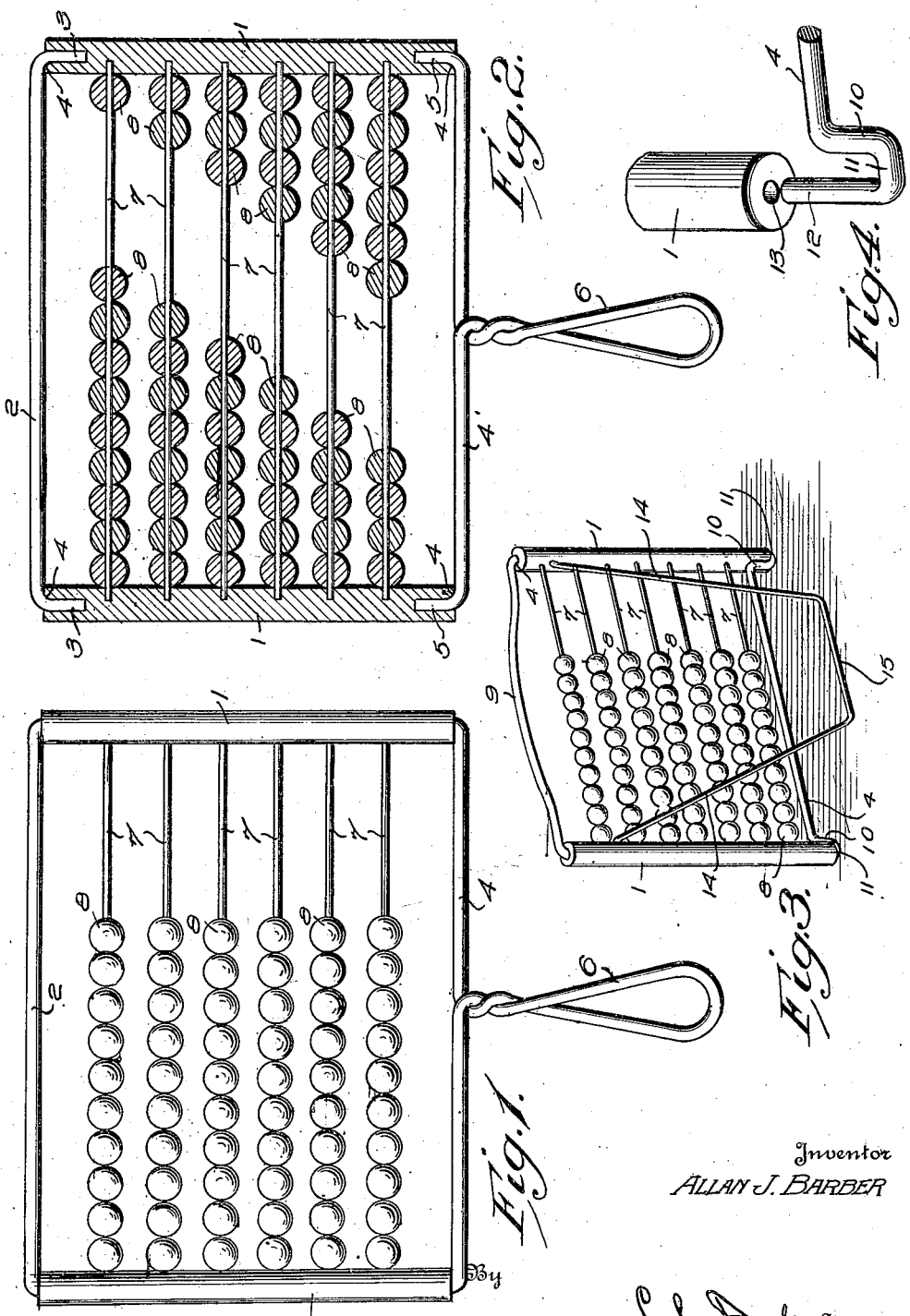
Inventor
ALLAN J. BARBER
By
C. H. Barber Attorney Patented Jan. 9, 1923.

1,441,323

UNITED STATES PATENT OFFICE.

ALLAN J. BARBER, OF WOONSOCKET, RHODE ISLAND.

ABACUS FRAME.

Application filed July 23, 1921. Serial No. 487,056.

*To all whom it may concern:*

Be it known that I, ALLAN J. BARBER, a citizen of the United States, residing at Woonsocket, in the county of Providence and State of Rhode Island, have invented certain new and useful Improvements in Abacus Frames, of which the following is a specification.

This invention relates to abacus frames, and methods of making the same.

An object of the invention is the provision of a simple and attractive form of abacus frame that can be cheaply manufactured. Heretofore, it has been customary to construct the outer frame entirely of wood and mortise the connections at the corners.

In the present invention, I have provided a method of making abacus frames wherein the necessity of mortising the corners is eliminated. The top and bottom members are formed of wire or other similar material and the side bars are formed of wood. The ends of the side bars are provided with holes slightly smaller in diameter than the diameter of the wire forming the top and bottom. The ends of the top and bottom are offset and inserted into these openings forming a strong, rigid frame. The cross bars are arranged in suitable openings at spaced intervals in the side bars.

The frame produced is strong and durable and may be manufactured at less expense than similar frames now in use.

In the accompanying drawings, I have shown several embodiments of the invention. In this showing:

Figure 1 is a front elevation of one form of the invention,

Figure 2 is a vertical sectional view of the form shown in Figure 1,

Figure 3 is a detail perspective view of another form of the invention, and,

Figure 4 is a detail view of the corner connections in the form shown in Figure 3 of the drawings.

Referring to the drawings, the reference numeral 1 designates the side bars and 2 the top bar. As shown, the top bar is provided with offset ends 3 arranged substantially at right angles to the body portion. These offset ends are adapted to be arranged in openings formed in the ends of the side bars, the openings being of slightly less diameter than the diameter of the wire to insure a tight fit. As shown, the offset ends are forced into the side bar until the corner 4 formed by the bending of the wire, engages the end of the side bar, insuring a tight fit. The bottom 4' is similar in construction to the top and is provided with similar offset ends 5. The wire member forming the bottom may be provided with a handle 6. A plurality of spaced parallel cross bars 7 are arranged in openings in the side bars, and spheres 8 are arranged on the these bars in the usual manner. When the side bars are formed of wood, the openings may be punched therein, and the desired number of openings may be punched in each bar in a single operation.

In the form of the invention shown in Figures 3 and 4 of the drawings, the top bar is provided with a curved portion 9 and the bottom bar is provided with ends offset from the frame as at 10. This offset portion is then extended parallel to the bottom bar, as at 11, forming a leg or support and a terminal 12 is extended in the opposite direction to the offset portion 10 and adapted to enter the opening 13 in the end of the side bar. A supporting member 14 is hinged to the side bars and is provided with a horizontal portion 15 forming an easel construction.

It will be apparent that an abacus frame manufactured according to the present method may be very easily and cheaply made, and readily assembled. When assembled, the frame is very strong and rigid, and possesses all the advantages of the more costly frames formed entirely of wood and provided with mortised joints.

It is to be understood that the forms of the invention herewith shown and described are to be taken as preferred examples of the same, and that various changes in the shape, size, and arrangement of parts may be resorted to without departing from the spirit of the invention or the scope of the subjoined claim.

Having thus described my invention, I claim:

An abacus frame comprising a pair of wooden side bars having longitudinal openings formed in each end, wire top and bottom members each having its ends bent, said ends being frictionally received in said openings, said side bars being further provided with a plurality of spaced transverse openings, and transverse bars having their ends arranged in said transverse openings.

In testimony whereof I affix my signature in presence of two witnesses.

ALLAN J. BARBER.

Witnesses:
 WILLIAM G. RICH,
 FREDERIC EARLE WHITAKER.